(12) United States Patent
Nitoh et al.

(10) Patent No.: US 6,421,227 B2
(45) Date of Patent: Jul. 16, 2002

(54) SOLID ELECTROLYTIC MULTILAYER CAPACITOR

(75) Inventors: Hiroshi Nitoh; Atsushi Sakai; Wataru Minamida; Yuji Furuta, all of Nagano (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/732,710

(22) Filed: Dec. 11, 2000

Related U.S. Application Data
(60) Provisional application No. 60/218,804, filed on Jul. 18, 2000.

(30) Foreign Application Priority Data

Dec. 10, 1999 (JP) .......................................... 1999-352360
Jul. 7, 2000 (JP) .......................................... 2000-206902

(51) Int. Cl.$^7$ ................................................. H01G 9/00
(52) U.S. Cl. .......................... 361/523; 361/532; 361/516
(58) Field of Search .................................. 361/523, 516, 361/524, 525, 528–529, 532; 29/25.03

(56) References Cited

U.S. PATENT DOCUMENTS 4,805,074 A * 2/1989 Harakawa et al. .......... 361/525
6,040,975 A * 3/2000 Mimura ...................... 361/523
6,249,424 B1 * 6/2001 Nitoh et al. ................. 361/523

FOREIGN PATENT DOCUMENTS

| | | |
|---|---|---|
| JP | 61-239617 | 10/1986 |
| JP | 61-240625 | 10/1986 |
| JP | 62-118511 | 5/1987 |
| JP | 1-169914 | 7/1989 |
| JP | 2-15611 | 1/1990 |
| JP | 4-167417 | 6/1992 |
| JP | 5-175082 | 7/1993 |
| JP | 5-205984 | 8/1993 |
| JP | 5-326343 | * 12/1993 |
| JP | 6-13269 | 1/1994 |
| JP | 6-29163 | 2/1994 |
| JP | 6-84716 | 3/1994 |
| JP | 10-32145 | 2/1998 |
| JP | 11-80596 | 3/1999 |

* cited by examiner

Primary Examiner—Anthony Dinkins
(74) Attorney, Agent, or Firm—Sughrue Mion, PLLC (57) ABSTRACT

A solid electrolytic capacitor is obtained by mounting a plurality of single plate capacitor elements within a chip by employing a stacking structure such as parallel stacking, opposing stacking, each layer-opposing stacking or closest stacking. As a result, a compact and high-capacitance element can be easily manufactured. The single plate capacitor element is preferably an element having an unfolded fan-like shape.

16 Claims, 4 Drawing Sheets

SOLID ELECTROLYTIC MULTILAYER CAPACITOR

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/218,804 filed Jul. 18, 2000 pursuant to 35 U.S.C. §111(b).

FIELD OF THE INVENTION

The present invention relates to a compact and large-capacitance solid electrolytic capacitor. The present invention also relates to a solid electrolytic multilayer capacitor comprising a solid electrolytic capacitor using an organic material such as electrically conducting polymer or an inorganic material such as metal oxide, as a solid electrolyte.

BACKGROUND OF THE INVENTION

To cope with the requirement for downsizing of electronic instruments, there is a demand for a solid electrolytic capacitor to be compact and have a large capacitance. For further reducing the size and increasing the capacitance of a solid electrolytic capacitor, it is necessary to reduce the size and increase the capacitance of the single plate solid electrolytic capacitor element housed therein itself and also to find a method capable of closely stacking the single plate elements within a limited size. In commercially available aluminum solid electrolytic capacitors, a solid electrolytic capacitor having a CV value per one unit volume of $7.0 \times 10^3$ V·F/m$^3$ is known.

Generally, a solid electrolytic capacitor contains at least one single plate capacitor element consisting of an anode part comprising a plate-like valve-acting metal having on the surface thereof an oxide dielectric film layer, and a cathode part constructed by forming a solid electrolyte layer and an electrically conducting layer sequentially on the oxide dielectric film layer. The solid electrolytic capacitor is completed by covering and sealing the periphery of the capacitor elements with a jacket resin. For the solid electrolyte layer, an organic material such as electrically conducting polymer or an inorganic material such as metal oxide is used.

In the stacking to obtain a solid electrolytic capacitor using an electrically conducting high molecular weight compound (or also called electrically conducting polymer) as the solid electrolyte, the anode part must be bent to enable spot welding after superposing respective cathode parts one on another to lie in parallel, because the cathode part of a single plate capacitor element, where a solid electrolyte layer and an electrically conducting layer are sequentially formed, is larger in the thickness than the anode part. Therefore, concentration of stress is generated in the vicinity of the boundary between the anode part and the cathode part of the single plate capacitor element and the capacitor is disadvantageously deteriorated in the capability. In order to solve this problem, various techniques have been heretofore proposed.

For example, in order to solve the difference in level between the anode part and the cathode part, a method of filling up the space between anode parts of a plurality of single plate capacitor elements with a metal plate having a thickness corresponding to the space at the time of stacking single plate capacitor elements (see, JP-A-5-205984) (the term "JP-A" as used herein means an "unexamined published Japanese patent application"), a method of forming an insulating resin layer in the space between the anode parts and attaining the connection by a metal fine line (see, JP-A-6-29163 and JP-A-6-84716), a method of working the lead frame by dividing it into pieces corresponding to the position of each anode part (see, JP-A-4-167417) and the like are known.

As described above, for further reducing the size and increasing the capacitance of a solid electrolytic capacitor, a matter of great concern is to what degree the single plate solid electrolytic capacitor element is reduced in size and increased in capacitance and how large capacitance can be realized for the solid electrolytic capacitor by closely stacking single plate elements within a limited size (for example, a standard specification size).

More specifically, since concentration of stress is generated in the vicinity of the boundary between the anode part and the cathode part at the time of stacking single plate solid electrolytic capacitor elements, it is necessary to find a method of eliminating the difference in level and thereby preventing the concentration of stress. However, a method of eliminating the difference in level results in increase of the working step or increase in the cost such as cost for processing the material. If the working step is increased, destruction of the single plate capacitor element or deterioration of the capability increases due to the mechanical stress or the like generated during the operation, which gives rise to a problem that the yield decreases in the production of multilayer capacitors or the capacitor obtained is disadvantageously inferior in capability.

The present invention is made to solve these problems and the object of the present invention is to provide a compact and large-capacitance solid electrolytic multilayer capacitor, in which generation of the concentration of stress in the vicinity of the boundary between the anode part and the cathode part at the stacking is prevented, and thereby the capacitor is freed from the reduction of yield in the production of multilayer capacitors.

SUMMARY OF THE INVENTION

The present invention provides a solid electrolytic multilayer capacitor fabricated by stacking single plate capacitor elements. More specifically, the present invention provides:

(1) a solid electrolytic multilayer capacitor comprising a multilayer capacitor element fabricated by stacking a plurality of single plate capacitor elements each essentially consisting of an anode substrate comprising a plate-like valve-acting metal having on the surface thereof an oxide dielectric film layer, with the edge part of the anode substrate acting as the anode part; and the area exclusive of the anode part, in which a solid electrolyte layer and an electrically conducting layer are sequentially formed on the oxide dielectric film layer, acting as the cathode part; the plurality of single plate capacitor elements being stacked such that the anode parts are stacked and fixed on a lead frame in the anode side while aligning respective anode parts toward the same direction; the cathode parts are stacked and fixed on a lead frame in the cathode side through an electrically conducting adhesive layer formed thereon, to have an unfolded fan-like shape spreading out toward the distal end of the cathode part from the anode part side; and the plate-like valve-acting metal of each single plate capacitor element in the area having the solid electrolyte layer lies almost in parallel with the lead frame in the cathode side.

(2) a solid electrolytic multilayer capacitor comprising two multilayer capacitor elements each fabricated by stacking a plurality of single plate capacitor elements each essentially consisting of an anode substrate comprising a plate-like valve-acting metal having on the surface thereof an oxide dielectric film layer, with the edge part of the anode substrate acting as the anode part; and the area exclusive of the anode part, in which a solid electrolyte layer and an electrically conducting layer are sequentially formed on the oxide dielectric film layer, acting as the cathode part; the plurality of single plate capacitor elements being stacked such that the anode parts are stacked and fixed on a lead frame in the anode side while aligning respective anode parts toward the same direction; and the cathode parts are stacked and fixed on a lead frame in the cathode side through an electrically conducting adhesive layer formed thereon, to have an unfolded fan-like shape spreading out toward the distal end of the cathode part from the anode part side; the cathode parts on the electrically conducting layers of two multilayer capacitor elements being bonded and fixed through the lead frame in the cathode side to lay respective anode parts in different directions.

(3) a solid electrolytic multilayer capacitor fabricated by stacking a plurality of single plate capacitor elements each essentially consisting of an anode substrate comprising a plate-like valve-acting metal having on the surface thereof an oxide dielectric film layer, with the edge part of the anode substrate acting as the anode part; and the area exclusive of the anode part, in which a solid electrolyte layer and an electrically conducting layer are sequentially formed on the oxide dielectric film layer, acting as the cathode part; the plurality of single plate capacitor elements being stacked such that the anode parts of respective single plate capacitor elements are alternately aligned toward opposing directions; the anode parts aligned toward the same direction of alternately stacked elements are stacked and fixed on a lead frame in the anode side, and the cathode parts are stacked and fixed one on another by forming an electrically conducting adhesive layer thereon, with at least one electrically conductive adhesive layer being fixed on a lead frame in the cathode side.

(4) a solid electrolytic multilayer capacitor fabricated by stacking and fixing a plurality of single plate capacitor elements each essentially consisting of an anode substrate comprising a plate-like valve-acting metal having on the surface thereof an oxide dielectric film layer, with the edge part of the anode substrate acting as the anode part; and the area exclusive of the anode part, in which a solid electrolyte layer and an electrically conducting layer are sequentially formed on the oxide dielectric film layer, acting as the cathode part, wherein the single plate capacitor elements stacked are not the same in the length of the solid electrolyte layer. The periphery of the multilayer capacitor element is sealed by a jacket resin.

The present invention also provides a solid electrolytic capacitor in which the CV value per unit volume of one chip is $7.1 \times 10^3$ V·F/m$^3$ or more and which is fabricated by stacking the above-described multilayer solid electrolytic capacitor elements to have a required capacitor chip size for enabling the housing thereof and then sealing and molding the stacking product with a jacket resin.

In the above-described solid electrolytic multilayer capacitor, an electrically conducting adhesive layer is preferably formed in the range from the distal end of the cathode part to 80% of the cathode part length and also the multilayer capacitor element is preferably obtained by stacking the plurality of single plate capacitor elements under pressure.

Furthermore, in the above-described solid electrolytic multilayer capacitor, the single plate capacitor element is preferably a single plate capacitor element where the thickness in the distal end portion of the cathode part is larger than the thickness in the basal portion of the cathode part. More specifically, a single plate capacitor element where the end part of the anode substrate comprising a plate-like valve-acting metal having on the surface thereof an oxide dielectric film layer acts as an anode part. The area exclusive of the anode part, in which a solid electrolyte layer and an electrically conducting layer are sequentially formed on the oxide dielectric film layer, acts as a cathode part, and the thickness of the distal end portion of the cathode part is larger than the thickness of the basal portion of the cathode part. In a more preferred embodiment of the single plate capacitor element, the stacking and fixing between respective cathode parts of the plurality of single plate capacitor elements and between the cathode part and a lead frame in the cathode side is performed by means of an electrically conducting adhesive layer and the thickness of the electrically conducting adhesive layer is larger in the distal end portion of the cathode part than in the basal side of the cathode part. In the above-described solid electrolytic multilayer capacitor, the solid electrolyte layer is preferably formed using an electrically conducting polymer rather than an inorganic material.

DESCRIPTION OF THE PREFERRED EMBODIMENTS

Figure 1:
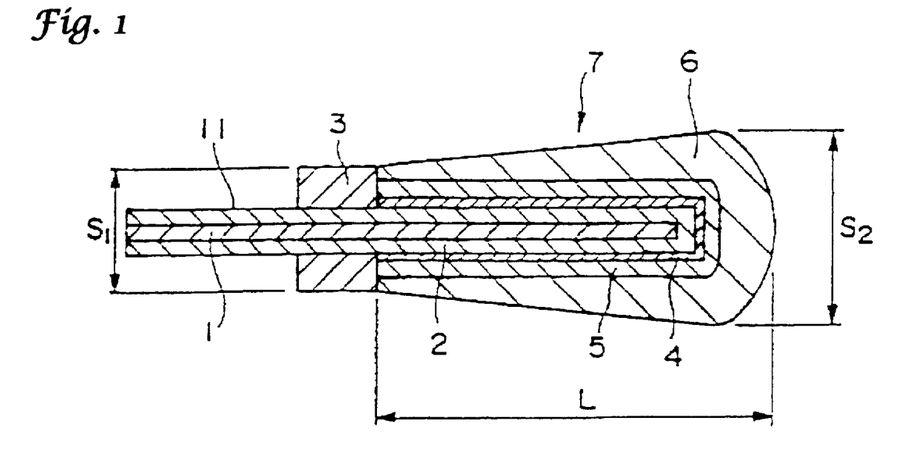
FIG. 1 is a schematic cross section showing one example of the single plate capacitor element for use in the present invention.
Figure 2:
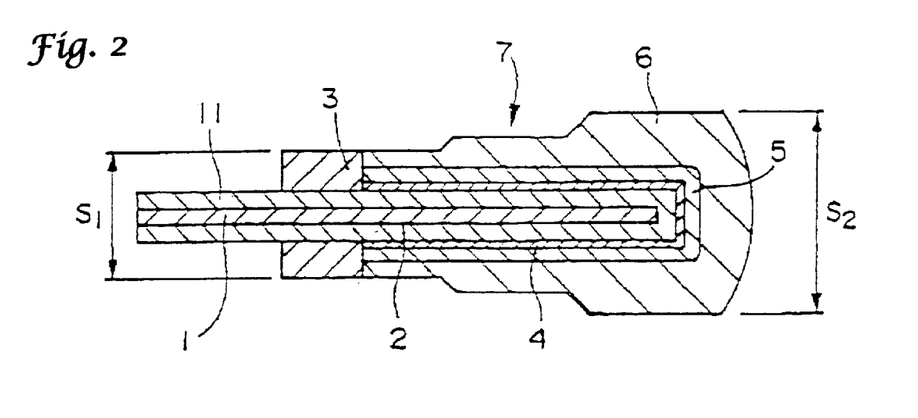
FIG. 2 is a schematic cross section showing one example of the single plate capacitor element for use in the present invention.

FIGS. 1 and 2 each is a schematic cross section showing an example of the single plate capacitor element which is preferably used in the present invention. In FIG. 1, the single plate capacitor element is a single plate capacitor element where the end part of an anode substrate 1 comprising a plate-like valve-acting metal having on the surface thereof an oxide dielectric film layer 2 acts as the anode part 11 and the area exclusive of the anode part 11 and the insulating layer 3, in which a solid electrolyte layer 4 and electrically conducting layers 5 and 6 are sequentially formed on the oxide dielectric film layer 2 acting as the cathode part. The thickness $S_2$ in the distal end portion of the cathode part is larger than the thickness $S_1$ in the basal portion of the cathode part, and also where the thickness of the cathode part is gradually increased toward the distal end direction of the cathode part from the anode part 11 side.

Figure 3:
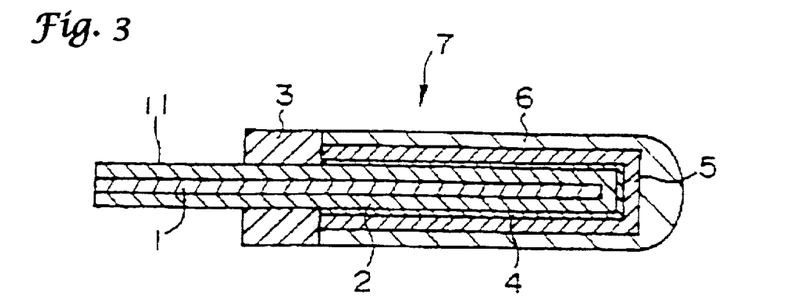
FIG. 3 is a schematic cross section showing one example of the single plate capacitor element for use in the present invention.

The single plate capacitor element shown in FIG. 2 is one example of the single plate capacitor element where the thickness of the cathode part is stepwise increased, and the single plate capacitor element shown in FIG. 3 is one example of the single plate capacitor element where top and bottom surfaces of the element lie almost in parallel without forming a club shape. A single plate capacitor element having such a shape may also be used as the single plate capacitor element of the solid electrolytic multilayer capacitor described in (1) to (4) above.

Figure 4:
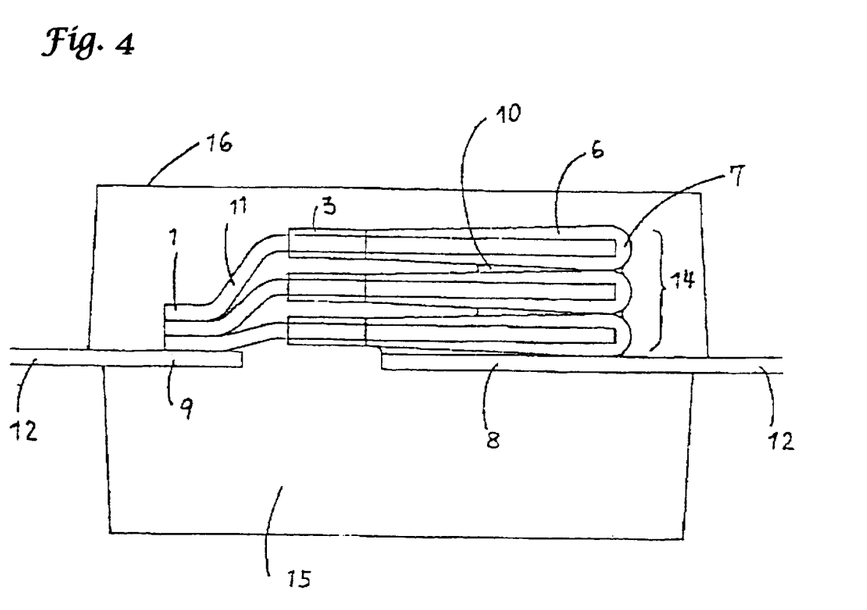
FIG. 4 is a schematic cross section showing an example of the multilayer capacitor element of the present invention.
Figure 5:
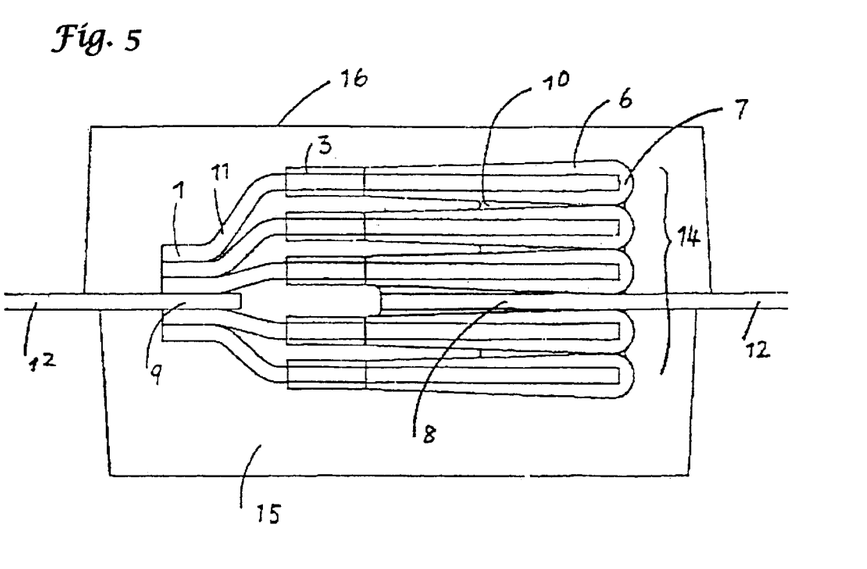
FIG. 5 is a schematic cross section showing an example of the multilayer capacitor element of the present invention.

FIGS. 4 and 5 each is a schematic cross section showing an example of the solid electrolytic multilayer capacitor 16 described in (1) above of the present invention, which is a solid electrolytic multilayer capacitor 16 obtained using a multilayer capacitor element 14 fabricated by stacking a plurality of single plate capacitor elements shown in FIG. 1. For example, FIG. 4 shows a solid electrolytic multilayer capacitor comprising a multilayer capacitor element fabricated by stacking a plurality of single plate capacitor elements 7 each essentially consisting of an anode substrate 1 comprising a plate-like valve-acting metal having on the surface thereof an oxide dielectric film layer, with the edge part of the anode substrate acting as the anode part 11, and the area exclusive of the anode part, in which a solid electrolyte layer, an electrically conducting layer 5 of carbon paste and an electrically conducting layer 6 of silver paste are sequentially formed on the oxide dielectric film layer, acting as the cathode part. The plurality of single plate capacitor elements being stacked such that the anode parts 11 are stacked and fixed on a lead frame 9 in the anode side while aligning respective anode parts toward the same direction. The cathode parts are stacked and fixed on a lead frame 8 in the cathode side through an electrically conducting adhesive layer 10 formed thereon, to have an unfolded fan-like shape spreading out toward the distal end of the cathode part from the anode part side, and the plate-like valve-acting metal of each single plate capacitor element 7 in the area having the solid electrolyte layer lies almost parallel with the lead frame 8 in the cathode side (this solid electrolytic multilayer capacitor is sometimes simply referred to as a "parallel stacking-type solid electrolytic multilayer capacitor").

Figure 6:
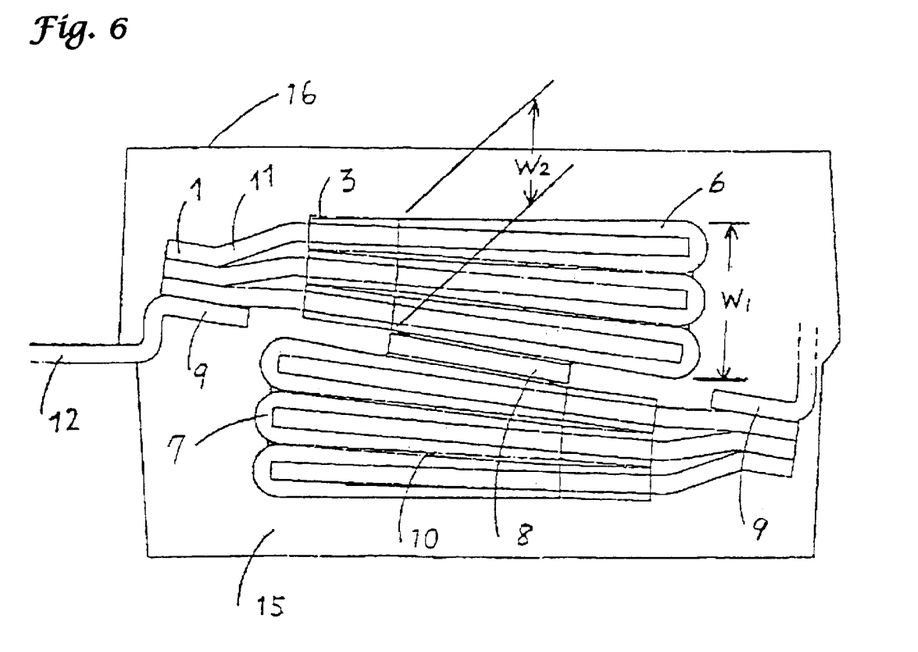
FIG. 6 is a schematic cross section showing an example of the multilayer capacitor element of the present invention.

FIG. 6 is a schematic cross section showing one example of the solid electrolytic multilayer capacitor 16 described in (2) above of the present invention, where two multilayer capacitor elements 14 each fabricated by stacking a plurality of the single plate capacitor elements 7 shown in FIG. 1 are bonded and fixed to lay in different directions respective to the anode parts. For example, FIG. 6 shows a solid electrolytic multilayer capacitor comprising two multilayer capacitor elements 14, each fabricated by stacking a plurality of single plate capacitor elements 7 each essentially consisting of an anode substrate 1 comprising a plate-like valve-acting metal having on the surface thereof an oxide dielectric film layer 2, with the edge part of the anode substrate acting as the anode part 11 and the area exclusive of the anode part, in which a solid electrolyte layer 4 and electrically conducting layers 5 and 6 are sequentially formed on the oxide dielectric film layer, acting as the cathode part. The plurality of single plate capacitor elements are stacked such that the anode parts are stacked and fixed on a lead frame 9 in the anode side while aligning respective anode parts toward the same direction and the cathode parts are stacked and fixed on a lead frame 8 in the cathode side through an electrically conducting adhesive layer 10 formed thereon, to have an unfolded fan-like shape spreading out toward the distal end of the cathode part from the anode part side. The cathode parts on the electrically conducting layers of two multilayer capacitor elements 14 being bonded and fixed through the lead frame 8 in the cathode side to lie in different directions respective to the anode parts 11 (this solid electrolytic multilayer capacitor 16 is sometimes simply referred to as an "opposing stacking-type solid electrolytic multilayer capacitor").

Figure 7:
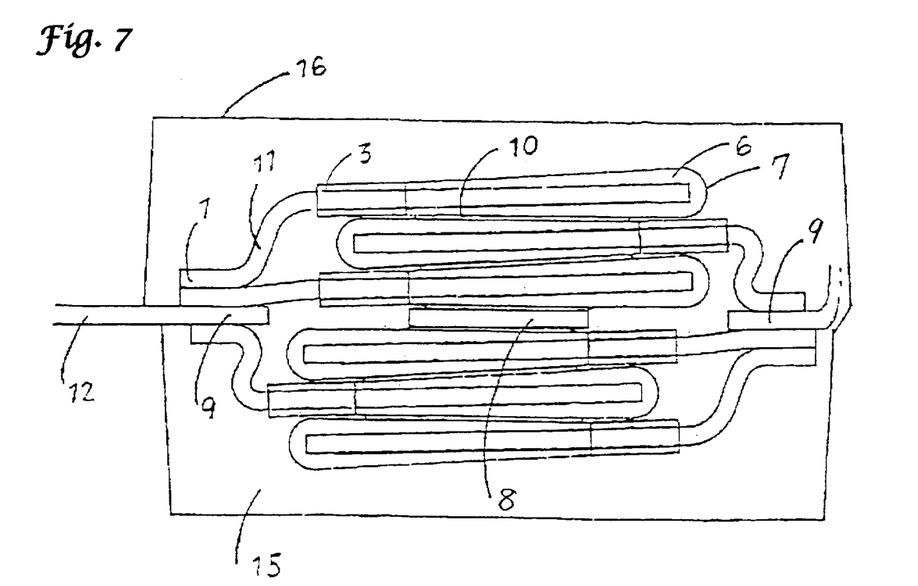
FIG. 7 is a schematic cross section showing an example of the multilayer capacitor element of the present invention.

FIG. 7 is a schematic cross section showing one example of the solid electrolytic multilayer capacitor 16 described in (3) above of the present invention, which is a solid electrolytic multilayer capacitor fabricated by stacking a plurality of single plate capacitor elements 7 such that the anode parts 11 of respective single plate capacitor elements are alternately aligned toward opposing directions. The anode parts aligned toward the same direction of alternately stacked elements are stacked and fixed on a lead frame 9 in the anode side, and the cathode parts are stacked and fixed one on another by forming an electrically conducting adhesive layer 10 thereon, with at least one electrically conductive adhesive layer 10 being fixed on a lead frame 8 in the cathode side (this solid electrolytic multilayer capacitor 16 is sometimes simply referred to as an "each layer opposing-type solid electrolytic multilayer capacitor").

Figure 8:
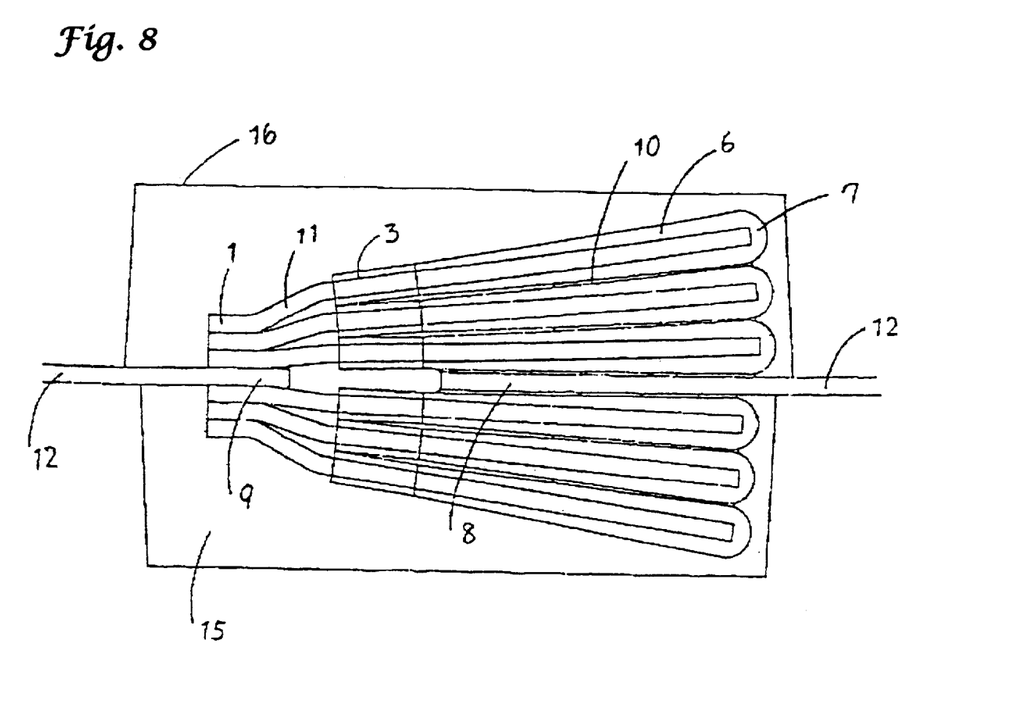
FIG. 8 is a schematic cross section showing an example of the multilayer capacitor element of the present invention.

FIG. 8 is a schematic cross section showing one example of the solid electrolytic multilayer capacitor 16 described in (4) above of the present invention, which is a solid electrolytic multilayer capacitor fabricated by closely and highly efficiently stacking a plurality of single plate capacitor elements 7 different in the length of the solid electrolyte layer 4 in a limited jacket resin size (this solid electrolytic multilayer capacitor is sometimes simply referred to as a "closest stacking-type solid electrolytic multilayer capacitor").

In the solid electrolytic multilayer capacitor of the present invention, the number of sheets of single plate capacitor elements stacked is generally from 2 to 20 sheets, preferably from 2 to 12 sheets, though it depends on the shape or thickness of the single plate capacitor element, the thickness design or capability required, the stacking form (for example, FIGS. 4 to 8) of the electrically conducting adhesive layer or the like.

The single plate capacitor element 7 for use in the solid electrolytic multilayer capacitor is preferably a single plate capacitor element where, as shown in FIG. 1, the cathode part has a tapered gradient such that the thickness $S_2$ in the distal end portion of the cathode part is larger than the thickness $S_1$ in the basal portion of the cathode part. In the case of manufacturing a solid electrolytic multilayer capacitor using such a single plate capacitor element, a stacking structure shown in FIGS. 6 or 7 is preferably used since a plurality of single plate capacitor elements are mounted in a limited chip volume. A stacking structure shown in FIG. 8 may also be used depending on the case. Incidentally, the cathode lead frame 8 and anode lead frame 9 may be formed of, for example, a known iron-based or copper-based alloy material or plated material.

The present invention is further described below.

In the present invention, in the case of obtaining a multilayer capacitor element 14 by stacking a plurality of single plate capacitor elements 7, the connection between each cathode parts and between the cathode part and the lead frame 8 in the cathode side is performed by means of an electrically conducting adhesive layer 10 (using an electrically conducting paste). The connection between respective anode parts and between the anode part 11 and the lead frame 9 in the anode side is performed by means of spot welding or laser welding.

It In the case of a stacking structure as shown in FIG. 4 or 5, the plate-like valve-acting metal in the area having the solid electrolyte layer 4 of the single plate capacitor element 7 lies nearly parallel to the lead frame 8 in the cathode side. Therefore, the anode part 11 may be bent so as to enable spot welding.

In the case of a stacking structure shown in FIGS. 6 to 8, a plurality of single plate capacitor elements 7 are stacked while aligning the anode parts 11 toward the same direction and approximating each anode part 11 to the surface of the lead frame 9 in the anode side to allow the thick cathode parts to form an unfolded fan-like shape spreading toward the cathode part side from the anode part 11 side, so that the concentration of stress can be prevented from occurring at the time of stacking. The single plate capacitor element is more preferably fabricated to have an unfolded fan-like shape shown in FIG. 1. By fabricating as such, it has been found that the anode part 11 can be easily fixed (stacked and fixed) by means of spot welding or the like and also the stacking and fixing between respective cathode parts and between the cathode part and the lead frame 8 in the cathode side through an electrically conducting adhesive layer 10 can be facilitated. As a result, a multilayer capacitor element 14 having excellent properties such as heat resistance can be obtained in a high yield. Incidentally, the electrically conducting adhesive layer 10 can be formed using an electrically conducting paste such as silver paste containing silver fine powder.

An example of an embodiment of mounting two sheets of single plate capacitor elements on a lead frame to have an unfolded fan-like shape is known (see, JP-A-6-13269). However, the example is substantially different from the present invention because the purpose of the example is to form an unfolded fan-like shape is to relax the curing stress of resin at the time of sealing with a jacket resin, and the example does not refer to the stacking and fixing of the anode part on the surface of a lead frame.

In the present invention, a large number of single plate capacitor elements are contained in a predetermined dimension of the jacket resin. Therefore, when a single plate capacitor element is stacked and fixed on a lead frame in the cathode side by means of an electrically conducting paste, the electrically conducting paste is preferably coated on in an appropriate amount a specific range of the cathode area and the lead frame. Furthermore, the single plate capacitor elements are preferably stacked and fixed under pressure, whereby a multilayer capacitor element having an unfolded fan-like shape can be easily obtained.

More specifically, at the time of stacking and fixing single plate capacitor elements on a lead frame in the cathode side using an electrically conducting paste, the pressure applied is preferably from about 17 to about 420 g/cm$^2$. Accordingly, in the case of a single plate capacitor element having a dimension of 0.3 mm (thickness)×3 mm (width)×4 mm (length), the single plate capacitor elements are stacked and fixed under a load of approximately from 2 to 50 g.

It has also been found that a multilayer capacitor element in an unfolded fan-like shape can be obtained without difficulty by forming, as shown in FIG. 1, the cathode part of a single plate capacitor element to have a tapered gradient to thereby provide an unfolded fan-like shape to the single plate capacitor element, or as shown in FIG. 2, by stepwise increasing the thickness of the cathode part of a single plate capacitor element to give an unfolded fan-like shape to the single plate capacitor element.

The single plate capacitor element for manufacturing a solid electrolytic multilayer capacitor is described below.

In the single plate capacitor element of the present invention, as shown in FIGS. 1 to 3, the end part of an anode substrate 1 comprising a plate-like valve-acting metal having on the surface thereof an oxide dielectric film layer 2 acts as the anode part 11 and the area exclusive of the anode part 11, in which a solid electrolyte layer 4 and an electrically conducting layers 5 and 6 are sequentially formed on the above-described oxide dielectric film layer, acts as the cathode part.

The oxide dielectric film layer 2 is formed on the surface of a pore comprising an etched valve-acting metal to give a dielectric layer having a large surface area. The oxide dielectric film layer 2 can be constructed by an oxide of a valve-acting metal such as alumina and tantalum oxide, or a sintered body thereof. Examples of the valve-acting metal for use in the present invention include aluminum, tantalum, niobium and titanium.

In the present invention, the anode substrate 1 indicates the support formed of the above-described valve-acting metal and when an oxide dielectric film layer 2 is formed on the surface thereof to manufacture a single plate capacitor, one end is referred to as the anode part 11. Before forming the oxide dielectric film layer 2, an etching treatment or the like is performed to enlarge the surface area of the anode substrate 1 and thereby increase the capacitance.

As shown in FIGS. 1 to 3, the anode part 11 and the cathode part of a single plate capacitor element are separated by an insulating layer 3, and a solid electrolyte layer 4 and electrically conducting layers 5 and 6 are formed on the cathode part.

The anode part 11 and the cathode part may be separated by providing the insulating layer 3 like a headband (circumferentially) while contacting the layer with the anode part 11. The insulating layer 3 is a layer for electrically insulating the cathode part from the anode part 11. The insulating layer 3 is formed of an insulating material and the material is not limited. Generally, for example, a heat-resistant resin may be used and a composition comprising a solvent-soluble or swellable heat-resistant resin or a precursor thereof, an inorganic powder and a cellulose-based resin (see, JP-A-11-80596) is preferably used. Specific examples thereof include polyphenylsulfone (PPS), polyethersulfone (PES), cyanic acid ester resin, fluororesin (e.g., tetrafluoroethylene, tetrafluoroethylene-perfluoroalkyl vinyl ether copolymer), polyimide and derivatives thereof. Among these, preferred are polyimide, polyethersulfone, fluororesin and precursors thereof.

The polyimide is a compound containing an imide structure in the main chain. Usually, a solution obtained by dissolving a polyamic acid as a precursor in a solvent is used and by heat-treating the solution after the coating, the imidization is attained. As described above, the material is not limited to the chemical structure of polyimide but is preferably a compound having an average molecular weight of 1,000 to 1,000,000, more preferably from 2,000 to 200,000, and capable of exhibiting excellent insulating property.

The solid electrolyte layer 4 may be formed of an electrically conducting polymer, an organic material containing tetracyanoquinodimethane (TCNQ), or an inorganic material such as metal oxide (e.g., manganese dioxide, lead dioxide), by chemical oxidation or electrolytic oxidation.

The electrically conducting layer 5 on the solid electrolyte layer 4 may be formed of carbon paste and the electrically conducting layer 6 on the electrically conducting layer 5 may be formed of an electrically conducting paste, however, the material and method therefor are not limited.

In the present invention, the electrically conducting polymer used for forming the solid electrolyte layer 4 may be an intrinsic electrically conducting polymer (see, JP-A-1-169914) or a known polymer such as π-conjugated polyaniline (see, JP-A-61-239617), polypyrrole as a 5-membered heterocyclic compound (see, JP-A-61-240625), polythiophene derivative (see, JP-A-2-15611) or polyisothianaphthene (see, JP-A-62-118511).

That is, the solid electrolyte layer 4 may be formed using an electrically conducting polymer containing at least one chemical structure selected from the group consisting of chemical structures of aniline, pyrrole, thophene, isothianaphthene and a substituted derivative thereof of forming a divalent group. In addition, a known electrically conducting polymer, namely, a polymer containing a chemical structure of benzene, p-phenylene vinylene, thienylene vinylene, naphtho[2,3-c]thiophene or a substituted derivative thereof of forming divalent group, may also be used for forming the solid electrolyte layer 4. Such an electrically conducting polymer is used in the form of an electrically conducting polymer composition containing a dopant for forming the solid electrolyte layer 4. Not only the addition of a dopant but also, for example, an organic or inorganic filler may further be used in combination.

In the case of using a polymer of a polymerizable 5-membered heterocyclic compound (hereinafter referred to as a "5-membered heterocyclic compound") such as pyrrole or thiophene, a method of dipping an anode foil in a lower alcohol and/or water-based solution of a 5-membered heterocyclic compound and then dipping it in an aqueous solution having dissolved therein an oxidizing agent and an electrolyte to cause chemical polymerization, thereby forming an electrically conducting polymer on the anode foil (see, JP-A-5-175082); a method of coating separately one after another or simultaneously 3,4-ethylenedioxy-thiophene monomer and an oxidizing agent each preferably in the form of a solution on the oxide dielectric film of a metal foil to form the layer (see, JP-A-2-15611 and JP-A-10-32145); and the like may be applied to the present invention. In addition, poly(3,4-ethylenedioxy-thiophene) doped with a specific organic sulfonic acid such as benzoquinonesulfonic acid or alicyclic sulfonic acid, disclosed in JP-A-10-32145 may also be used in the present invention.

Furthermore, for the solid electrolyte 4 in the single plate capacitor element and the solid electrolytic multilayer capacitor of the present invention, a polymer of a 3,4-ethylenedioxy-thiophene derivative represented by the following formula (I) may also be suitably used:

(I)

wherein $R^1$ and $R^2$ each independently represents hydrogen atom, a linear or branched, saturated or unsaturated hydrocarbon group having from 1 to 6 carbon atoms, or a substituent for forming at least one 5-, 6- or 7-membered saturated hydrocarbon ring structure containing the two oxygen elements resulting from combining of the hydrocarbon groups having from 1 to 6 carbon atoms to each other at an arbitrary position. The ring structure formed includes those having a vinylene group which may be substituted, and a phenylene structure which may be substituted.

Also, a polymer containing a chemical structure of a divalent group represented by the following formula (II) may be suitably used for forming the solid electrolyte 4;

(II)

wherein $R^3$, $R^4$, $R^5$ and $R^6$ each independently represents a monovalent group selected from the group consisting of hydrogen atom, a linear or branched, saturated or unsaturated alkyl group having from 1 to 10 carbon atoms, an alkoxy group, an alkyl ester group, a halogen atom, a nitro group, a cyano group, a primary, secondary or tertiary amino group, a trifluoromethyl group, a phenyl group and a substituted phenyl group, and the hydrocarbon chains of $R^3$, $R^4$, $R^5$ and $R^6$ may combine with each other at an optional position to form a divalent group for forming a 3-, 4-, 5-, 6- or 7-membered saturated or unsaturated hydrocarbon ring structure together with the carbon atoms to which those groups are substituted.

In formula (II), the alkyl group, the alkoxy group and the alkyl ester group represented by $R^3$, $R^4$, $R^5$ and $R^6$ and the cyclic hydrocarbon chain formed thereby may contain a carbonyl bond, an ether bond, an ester bond, an amido bond, a sulfido bond, a sulfinyl bond, a sulfonyl bond or an imino bond in any number of bonds. In formula (II), δ represents an electric charge number per the repeating unit and is a number of 0 to 1.

In the single plate capacitor element and the solid electrolytic multilayer capacitor of the present invention, however, the chemical structure is not particularly limited and the material for forming the solid electrolyte 4 usually has an electric conductivity of from 0.1 to 200 S/cm, preferably from 1 to 100 S/cm, more preferably from 10 to 100 S/cm.

As the oxidizing agent suitable for the oxidative polymerization of the 5-membered heterocyclic compound such as pyrrole and thiophenes, oxidizing agents over a wide range, such as iron(III) chloride, Fe(ClO$_4$)$_3$, organic acid iron(III) salt, inorganic acid iron(III) salt, alkyl persulfate, ammonium persulfate and hydrogen peroxide described in JP-A-2-15611, may be used. Examples of the organic acid in the organic acid iron(III) include an alkylsulfonic acid having from 1 to 20 carbon atoms, such as methanesulfonic acid and dodecylbenzenesulfonic acid, and an aliphatic carboxylic acid having from 1 to 20 carbon atoms. However, the use range of the oxidizing agent may be sometimes restricted by the chemical structure of the above-described monomer, the oxidizing agent, the reaction conditions and the like. For example, according to *Handbook of Conducting Polymers*, page 99, FIG. 5, Marcel Dekker, Inc. (1987), in the oxidation (polymerization) of thiophenes, the species of the substituent greatly affects the oxidation potential (one index for showing whether the polymerization readily occurs or not) and in turn, governs the oxidation reaction (the oxidation potential expands over a wide range from about 1.8 to about 2.7 V). Accordingly, the combination of the monomer compound used with the oxidizing agent and the reaction conditions is important.

The dopant contained in the electrically conducting polymer is not limited to the polymer having a π electron-conjugated structure. The dopant is usually an anion and the anion may be either a low molecular anion or a high molecular weight anion such as polymer electrolyte. Specific examples thereof include halide anion of Group 5B element, such as $PF_6^-$, $SbF_6^-$ and $AsF_6^-$, halide anion of Group 3B element, such as $BF_4$, halogen anion such as I (e.g., $I_3^-$), Br and Cl$^-$, perhalogenate anion such as $ClO_4^-$, Lewis acid anion such as $AlCl_4^-$, $FeCl_4^-$ and $SnCl_4^-$, inorganic acid anion such as $NO_3^-$ and $SO_4^{2-}$, and protonic acid anion including organic sulfonate anion such as p-toluenesulfonic acid, naphthalenesulfonic acid, alkyl-substituted naphthalenesulfonic acid having from 1 to 5 carbon atoms, $CF_3SO_3^-$ and $CH_3SO_3^-$, and carboxylate anion such as $CH_3COO^-$ and $C_6H_5COO$.

Among these, preferred are organic sulfonate anion and organic phosphate anion. In the case of the organic sulfonic acid anion, various compounds may be applied, such as aromatic sulfonate anion, aromatic polysulfonate anion, organic sulfonate anion substituted by an OH group or a carboxy group, and aliphatic organic sulfonate anion having a skeleton of adamantane or the like.

Examples of the organic sulfonic acid include benzenesulfonic acid, p-toluenesulfonic acid, methanesulfonic acid, ethanesulfonic acid, α-sulfo-naphthalene, β-sulfonaphthalene, naphthalenedisulfonic acid and alkylnaphthalenesulfonic acid (the alkyl group is butyl, triisopropyl, di-t-butyl or the like).

Other examples include sulfoquinone compound anion having one or more sulfo-anion group and a quinone structure within the molecule (hereinafter simply referred to as "sulfoquinone anion"), anthracene sulfonate anion, naphthalene sulfonate anion, benzene sulfonate anion and xylylene disulfonate anion (including o-, p- and m-).

Examples of the basic skeleton of the sulfoquinone anion include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-5 chrysenequinone, 5,6-chrysenequinone, 6,12-chrysenequinone, acenaphtoquinone, acenaphthenequinone, carhorquinone, 2,3-bornanedione, 9,10-phenanthrenequinone and 2,7-pyrenequinone.

Among these, the sulfoquinone for use in the present invention is preferably a sulfoquinone having a skeleton of anthraquinone, 1,4-naphthoquinone or 2,6-naphthoquinone. In the case of having a skeleton of anthraquinones, examples of the sulfoquinone which can be used include anthraquinone-1-sulfonic acid, anthraquinone-2-sulfonic acid, anthraquinone-1,5-disulfonic acid, anthraquinone-1,4-disulfonic acid, anthraquinone-1,3-disulfonic acid, anthraquinone-1,6-disulfonic acid, anthraquinone-1,7-disulfonic acid, anthraquinone-1,8-disulfonic acid, anthraquinone-2,6-disulfonic acid, anthraquinone-2,3-disulfonic acid, anthraquinone-2,7-disulfonic acid, anthraquinone-1,4,5-trisulfonic acid, anthraquinone-2,3,6,7-tetrasulfonic acid, alkali metal salts thereof and ammonium salts thereof.

In the case of having a skeleton of 1,4-naphthoquinones, examples of the sulfoquinone which can be used include 1,4-naphthoquinone-5-sulfonic acid, 1,4-naphthoquinone-6-sulfonic acid, 1,4-naphthoquinone-5,7-disulfonic acid, 1,4-naphthoquinone-5,8-disulfonic acid, alkali metal salts thereof and ammonium salts thereof.

In the case of having a skeleton of 2,6-naphthoquinones, examples of the sulfoquinone which can be used include 2,6-naphthoquinone-1-sulfonic acid, 2,6-naphthoquinone-3-sulfonic acid, 2,6-naphthoquinone-4-sulfonic acid, 2,6-naphthoquinone-3,7-disulfonic acid, 2,6-naphthoquinone-4,8-disulfonic acid, alkali metal salts thereof and ammonium salts thereof.

In acidition, the sulfoquinone may also be selected from industrial dyes and examples thereof include Anthraquinone Iris R and Anthraquinone Violet RN-3RN. These industrial dyes are a useful sulfoquinone-based dopant and each may be used in the form of the above-described salt.

Furthermore, polyelectrolyte anion may also be used, such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid.

The dopant also includes reductant anion of known oxidizing agents capable of producing the above-described electrically conducting polymer. Examples thereof include sulfate ion as the product anion of an oxidizing agent such as alkali metal persulfates and ammonium persulfates. Other examples include dopants produced from manganese such as potassium permanganate, or from quinones such as 2,3-dichloro-5,6-dicyano-1,4-benzoquinone (DDQ) and tetrachloro-1,4-benzoquinone, tetracyano-1,4-benzoquinone.

In the present invention, at least one of these dopants is suitably used in the electrically conducting polymer. For instance, the electrically conducting polymer contains sulfonate ion as a dopant in the range of 0.01 to 10 mol % based on all repeating units of the π-corjugated structure and the above-described sulfoquinone anion, for example, anthraquinone sulfonate anion, as another dopant in the range of 1 to 50 mol %.

The single plate capacitor element is described below.

As shown in FIGS. 1 and 2, when a dub-shaped single capacitor element such that the thickness in the distal end portion of the cathode part is larger than the thickness in the basal portion of the cathode part is used, the multilayer capacitor element 19 obtained by stacking the single capacitor elements in the production of a solid electrolytic multilayer capacitor is liable to have an unfolded fan-like shape. In other words, the single plate capacitor element 7 preferably has a shape such that, as shown in FIG. 1, the total thickness of the solid electrolyte layer 4 and electrically conducting layers 5 and 6 is gradually increased toward the distal end of the cathode part, or a shape such that, as shown in FIG. 2, the thickness is stepwise increased toward the distal end of the cathode part.

According to another embodiment of the present invention, in the club-shaped single plate capacitor element, the ratio $S_2/S_1$ of the thickness $S_1$ in the basal portion of the cathode part to the maximum thickness $S_2$ in the distal end portion is suitably from 1.1 to 5.0, more preferably from 1.3 to 3.0.

An example of a method for obtaining a single plate capacitor element 7 having the shape shown in FIG. 1 is a method of, after coating electrically conducting pastes, mechanically molding the stacking product under pressure to increase the thickness of the electrically conducting layers 5 and 6 in the distal end side. Another example is a method of repeatedly coating electrically conducting pastes on the distal end of the element 7 to, as shown in FIGS. 1 and 2, gradually or stepwise increase the thickness of the electrically conducting layers 5 and 6. As long as the thickness in the distal end portion of the element 7 can be made larger than the thickness S. in the basal portion of the cathode part, any method may be used.

The single plate capacitor elements may be stacked, for example, by using an electrically conducting paste on the lead frame in the cathode side of each sheet or by previously stacking two or more sheets into the unfolded fan-like shape and bonding the stacking product to the lead frame in the cathode side. The thus-obtained elements may further be stacked one on another. In addition, a method other than these may also be used. The single plate capacitor elements may be stacked on one side (see, for example, FIG. 4) or both sides (see, for example, FIGS. 5, 6 and 8) of the front and back surfaces of the lead frame.

The single plate capacitor element may not be shaped like a club but single plate capacitor elements may be stacked into an unfolded fan-like shape such that the top and bottom surfaces of the element lie almost in parallel. For obtainig a multilayer capacitor element as such, a method of increasing the thickness of the electrically conducting adhesive layer in the distal end side of the cathode part more than in the basal portion side of the cathode part may be used.

The electrically conducting adhesive layer between respective cathode parts and the electrically conducting adhesive layer between a cathode part and the lead frame in the cathode side are each preferably formed in the range from the distal end of the cathode part to 80% of the cathode part length L (see, FIG. 1) (namely, the length $L_1$ of the electrically conducting adhesive layer from the distal end of the cathode part is 0.8×L or less). if the electrically conducting adhesive layer is formed in excess of the range from the distal end to 80%, the electrically conducting paste may reach the anode part at the stacking, this may cause short circuit to decrease the yield or even if not short-circuited, and may result in increase of the leakage current to deteriorate the capability. For forming the electrically conducting adhesive layer in the range of 80% of the cathode part length L, the electrically conducting paste is preferably coated in the range of a half of the cathode part length from the distal end side.

The plurality of single plate capacitor elements are preferably stacked while mechanically applying a pressure to give a multilayer capacitor element having an unfolded fan-type shape. More specifically, at the time of stacking a plurality of single plate capacitor elements on a lead frame in the cathode side using an electrically conducting paste, an appropriate pressure is applied to the single plate capacitor elements by means of a pressure board to control the thickness of the electrically conducting paste, whereby a predetermined unfolded fan-like shape can be formed.

At this time, when the thickness of the electrically conducting adhesive layer is gradually increased from the basal portion of the cathode part toward the distal end portion of the cathode part, the thickness in the distal end portion of the cathode part of the multilayer capacitor element becomes larger than the thickness in the basal portion of the cathode part. As a result, the multilayer capacitor element can readily have an unfolded fan-like shape. For example, as shown in FIGS. 6 and 8, the multilayer capacitor element 14 preferably has an unfolded fan-like shape such that the ratio $W_2/W_1$ of the thickness $W_1$ in the basal portion of the cathode part of the multilayer capacitor element 14 to the maximum thickness $W_2$ in the distal end portion of the cathode part of the element 14 is from 1.3 to 5.5, more preferably from 1.5 to 3.5.

The anode part of the single plate capacitor element may be bent after the stacking of single plate capacitor elements or may be previously bent before the stacking.

For connecting an anode part to an anode part and also for connecting an anode part to the lead frame in the anode part, any method may be used, such as spot welding, laser welding and connection through an electrically conducting paste. The order of stacking the cathode parts and connecting the anode parts is not particularly limited and either may come first or these may be alternately performed. In any case, the matter of importance is to manufacture a multilayer capacitor element while preventing a large mechanical stress from being applied on the single plate capacitor element 7.

The multilayer capacitor element 14 is molded with a jacket resin 15 and a lead frame outside the jacket resin is bent along the jacket resin and used as an exterior lead 12, thereby completing a solid electrolytic multilayer capacitor 16. Examples of the jacket resin include epoxy resin and phenol resin. Examples of the constructive material for the external lead include 42 Alloy.

When single plate capacitor elements are stacked and fixed on the lead frame in the anode side while aligning the anode parts toward the same direction or when a dub-shaped single plate capacitor element is used, the multilayer capacitor element can be prevented from protruding from the jacket resin and at the same time, and the number of sheets of the single plate capacitor elements stacked can be increased to obtain a high-capacitance solid multilayer capacitor.

In the present invention, by designing the stacking structure, the solid electrolytic capacitor can be manufactured to satisfy the capacitor chip size required in the rated specification. For instance, by applying the stacking structure of the present invention, a solid electrolytic capacitor where the capacitor chip has a CV value per unit volume, of $7.1 \times 10^3$ V·F/m$^3$ (or corresponding to $7.1 \times 10^3$ V·F/m$^3$ or more), preferably $7.3 \times 10^3$ V·F/m$^3$ or more, more preferably $7.8 \times 10^3$ V·F/m$^3$ or more, can be provided.

For example, as a solid electrolytic capacitor in the rated specification of 6.3 V/100 $\mu$F, a solid electrolytic capacitor manufactured in a D-case size (0.73 cm×0.43 cm×0.29 cm (height)) can have a CV value per unit volume, of $7.1 \times 10^3$ V·F/m$^3$ or more.

EXAMPLES

The present invention Is described in greater detail below by referring to the Examples, however, the present invention is by no means limited to these Examples. Unless otherwise indicated herein, all parts, percentages, ratios and the like are by weight.

Example 1

Manufacture of Club-Shaped Single Plate Capacitor Element

In an etched foil (anode substrate 1) of aluminum (valve-acting metal) having a thickness of 90 $\mu$m, a length of 5 mm and a width of 3 mm, where an oxide dielectric film layer 2 of alumina ($Al_2O_3$) is formed on the surface, the area having a length of 2 mm at the top end and a width of 3 mm was used as the anode part 11 and the remaining area of 3 mm×3 mm was subjected to chemical forming at 13 V in an aqueous 10 mass % ammonium adipate solution to form an oxide dielectric film layer 2 on the cut end portion and thereby prepare a dielectric material. The surface of this dielectric material was impregnated with an aqueous solution prepared to contain 20 mass % of ammonium persulfate and 0.1 mass % of sodium anthraquinone-2-sulfonate (produced by Tokyo Kasei K.K.), and then the substrate was dipped in 1.2 mol/l of an isopropanol solution having dissolved therein 5 g of 3,4-ethylenedioxy-thiophene (Baytronm™ M, produced by Bayer AG). Thereafter, the substrate was taken out, left standing in an environment at 60° C. for 10 minutes, thereby completing the oxidative polymerization, and then washed with water. By repeating the polymerization reaction treatment and the washing process each 10 times, a solid electrolyte layer 4 of an electrically conductive polymer was formed.

Subsequently, the substrate was dipped in a carbon paste tank and the paste was solidified to form an electrically conducting layer 5. Thereafter, an operation of dipping the substrate in a silver paste tank and solidifying the paste was repeated to gradually increase the thickness of the electrically conducting layer 6 toward the distal end, thereby obtaining a club-shaped single plate capacitor element 7 shown in FIG. 1. In this single plate capacitor element 7, the ratio $S_2/S_1$ between the thickness $S_1$ in the basal portion of the cathode part and the maximum thickness $S_2$ in the distal end thereof was 2.1.

Examnle 2

FIG. 4 shows a schematic view of the multilayer capacitor element of this Example. Three sheets of the single plate capacitor elements manufactured by the method of Example 1 were prepared and stacked, as shown in FIG. 4, while aligning three anode parts 11 to the left side and aligning three cathode parts to the right side, by using an electrically conducting paste between a cathode and a cathode and between a cathode and a lead frame 8, to lay the area having the solid electrolyte layer and the plate-like valve-acting metal almost in parallel with the lead frame 8 in the cathode side, thereby obtaining a multilayer capacitor element. While bending the anode part 11 of this stacking product, the anode parts 11 with each other and the one surface of the lead frame 9 with the lower surface of the anode part 11 were bonded by spot welding, whereby a multilayer capacitor element shown in FIG. 4 was obtained. The electrically conducting paste was coated in the length from the distal end to 80% of the cathode part length L

Example 3

FIG. 6 shows a schematic view of the multilayer capacitor element of this Example. Six sheets of the single plate capacitor elements manufactured by the method of Example 1 were prepared. Out of these, three sheets were stacked while aligning three anode parts 11 to the left side and aligning three cathode parts to the right side by bonding a cathode to a cathode, and also bonding a cathode to a lead frame 8 using an electrically conducting paste to thereby manufacture a three sheet-stacked multilayer capacitor element. The electrically conducting paste was coated in the length from the distal end to 50% of the cathode part length L. In this way, two units of three sheet-stacked multilayer capacitor elements were manufactured and these multilayer capacitor elements were bonded and fixed, as shown in FIG. 6, to oppose each other through a cathode lead frame 8. The multilayer capacitor manufactured to have such a stacking structure realized the closest stacking with a small size and a small volume.

Example 4

FIG. 7 shows a schematic view of the multilayer capacitor element of this Example. Six sheets of the single plate capacitor elements manufactured by the method of Example 1 were prepared and out of these, three sheets were stacked one by one while alternately laying the anode parts in the opposing directions. In this way, two units of such multilayer capacitor elements were manufactured and these multilayer capacitor elements were sequentialy stacked and fixed on the front and back surfaces of a lead frame in the cathode side by forming thereon an electrically conducting adhesive layer. At this time, the anode parts were stacked and fixed on a lead frame in the anode side in the same direction, and if desired, while bending the anode part. The cathode parts of the plurality of single plate capacitor elements were sequentially stacked and fixed by forming an electrically conducting adhesive layer. The electrically conducting paste was coated in the length from the distal end to 50% of the cathode part length L

Example 5

FIG. 8 shows a schematic view of the multilayer capacitor element of this Example. By employing the method of Example 1, two pairs of capacitor groups each consisting of three iands of single plate solid electrolytic capacitors different in the length of solid electrolyte layers were manufactured. As shown in FIG. 8, a single plate solid electrolytic capacitor shortest in the length of the solid electrolyte layer was taken out and bonded on a lead frame 8 by means of an electrically conducting paste, and thereon, single plate solid electrolytic capacitors longer than the length of the solid electrolyte layer were sequentially stacked and fixed while aligning the anode parts 11 to the left side and aligning the cathode parts to the right side with the interposition of an electrically conducting adhesive layer between a cathode part and a cathode part. Thus, three sheets were stacked. On the back side of the lead frame 8, three sheets of single plate solid electrolytic capacitors were bonded to have the same stacking structure. In this way, 6 sheets in total of single plate solid electrolytic capacitors were mounted on the front and back surfaces of the lead frame. While bending, if desired, the anode parts 11 of the stacking product, the anode parts 11 were spot welded with each other and one surface of the lead frame 9 with the lower surface of an anode part 11 were spot welded, thereby manufacturing a multilayer capacitor element shown in FIG. 8. The electrically conducting paste was coated in the length from the distal end to 50% of the cathode part length L.

In the manufacture of those single plate solid electrolytic capacitors different in the length of the solid electrolyte layer, the difference in the length was attained by controlling the dipping term in the oxidizing agent bath (an aqueous solution containing ammonium persulfate/sodium anthraquinone-2-sulfonate described in Example 1) and the dipping term in the monomer bath (an isopropanol solution of 3,4-ethylenedioxy-thiophene described in Example 1) used for the production of the solid electrolyte layer.

Example 6

Evaluation of Capacitor Properties

The multilayer capacitors having a stacking structure described in Examples 2 to 5 were taken as one evaluation unit and after manufacturing 30 chips (n=30) for each capacitor, the properties were evaluated by the yield (%) and the leakage current after reflow soldering test. The results obtained are shown together in Table 1.

TABLE 1

| | | Leakage Current after Reflow Soldering Test (Note 2) | |
|---|---|---|---|
| Stacking Structure (number of sheets stacked) | Yield (%) (Note 1) | Average ($\mu$A) | Range ($\mu$A) (Note 3) |
| Example 2 parallel (3 sheets) | 92 | 0.3 | 0.3 |
| Example 3 opposing (6 sheets) | 87 | 0.3 | 0.4 |

TABLE 1-continued

| Stacking Structure (number of sheets stacked) | Yield (%) (Note 1) | Leakage Current after Reflow Soldering Test (Note 2) | |
|---|---|---|---|
| | | Average ($\mu$A) | Range ($\mu$A) (Note 3) |
| Example 4  opposing (6 sheets) | 78 | 0.5 | 0.5 |
| Example 5  non-parallel (6 sheets) | 80 | 0.4 | 0.5 |

Note:
1) By rating acceptable with a leakage current of 1 $\mu$A or less, the yield was calculated.
2) The average and the dispersion of leakage current values after the heat treatment (with a peak of 240° C.) in a reflow furnace were evaluated (number of tested elements, n = 30).
3) The range means the difference between the maximum current value and the minimum current value.

Example 7

Evaluation of Compact Capacitor Having Large Capacitance

As one example for the evaluation of compactness and large capacitance, a 8-sheet solid electrolytic multilayer capacitor was manufactured according to the method of Example 3. In the manufacture of this capacitor, however, a D-case size (0.73 cm×0.43 cm×0.29 cm (height)) in the rated specification of 6.3 V was used. The CV value of the manufactured compact capacitor having large capacitance was evaluated and the results are shown in Table 2.

TABLE 2

| Dimension of Element (Solid Electrolyte Layer) | | | Number of Sheets Stacked, sheets | Average of Capacitance per Chip (n = 30), $\mu$F (Note 4) | CV Value, $10^3$ F·V/m$^3$ |
|---|---|---|---|---|---|
| Width, cm | Length, cm | Area, cm$^2$ | | | |
| 0.3 | 0.41 | 0.123 | 8 | 108.1 | 7.75 |
| 0.35 | 0.43 | 0.1505 | 8 | 130.6 | 9.36 |
| 0.35 | 0.43 | 0.1505 | 6 | 99.3 | 7.12 |

Note: (4) "Chip" means a solid electrolyte multilayer capacitor.

According to the stacking structure of the present invention, the manufacture of a compact and large-capacitance element can be realized. For example, as a solid electrolytic capacitor in the rated specification of 6.3 V/100 $\mu$F, a solid electrolytic capacitor in a D-case size and having a CV value per unit volume, of 7.1×10$^3$ V·F/m$^3$ or more can be easily manufactured. Also, by the stacking structure of the present invention, a multilayer capacitor element excellent in the yield and heat resistance can be obtained. Furthermore, by virtue of the improved yield, the cost for the manufacture of the capacitor can be greatly reduced.

While the invention has been described in detail and with reference to specific embodiments thereof, it will be apparent to one skilled in the art that various changes and modifications can be made therein without departing from the spirit and scope thereof.

What is claimed is:

1. A solid electrolytic multilayer capacitor comprising a multilayer capacitor element comprising a plurality of single plate capacitor elements comprising
   an anode substrate comprising a plate-like valve-acting metal having on the surface thereof an oxide dielectric film layer, wherein an edge part of the anode substrate acts as the anode part and an area of said oxide dielectric film layer where a solid electrolyte layer and an electrically conducting layer are sequentially formed acts as a cathode part,
   said plurality of single plate capacitor elements are stacked such that the anode parts are stacked and fixed on a lead flame in the anode side while aligning the respective anode parts toward the same direction,
   wherein in the single plate capacitor element, a thickness of a distal end portion of the cathode part is larger than a thickness in a basal portion of the cathode part,
   the cathode parts are stacked and fixed on a lead flame in the cathode side through an electrically conducting adhesive layer to have an unfolded fan-like shape spreading out toward the distal end of the cathode part from the anode part side, and the plate-like valve-acting metal of each single plate capacitor element in the area having said solid electrolyte layer lies almost in parallel with the lead flame in the cathode side.

2. A solid electrolytic multilayer capacitor comprising two multilayer capacitor elements each comprising a plurality of stacked single plate capacitor elements comprising
   an anode substrate comprising a plate-like valve-acting metal having on the surface thereof an oxide dielectric film layer, wherein an edge part of the anode substrate acts as an anode part and an area of said oxide dielectric film layer where a solid electrolyte layer and an electrically conducting layer are sequentially formed acts as a cathode part,
   said plurality of single plate capacitor elements are stacked such that the anode parts are stacked and fixed on a lead frame in an anode side while aligning the respective anode parts toward the same direction,
   the cathode parts are stacked and fixed on a lead frame in a cathode side through an electrically conducting adhesive layer to have an unfolded fan-like shape spreading out toward the distal end of the cathode part from the anode part side,
   the cathode parts on the electrically conducting layers of two multilayer capacitor elements are bonded and fixed through the lead frame in the cathode side to lay in different directions respective to the anode parts.

3. A solid electrolytic multilayer capacitor each comprising a plurality of stacked single plate capacitor elements comprising
   an anode substrate comprising a plate-like valve-acting metal having on the surface thereof an oxide dielectric film layer, wherein an edge part of the anode substrate acts as an anode part and an area of said oxide dielectric film layer where a solid electrolyte layer and an electrically conducting layer are sequentially formed acts as a cathode part,
   said plurality of single plate capacitor elements being stacked such that the anode parts of respective single plate capacitor elements are alternately aligned toward opposing directions, the anode parts aligned toward the same direction of alternately stacked elements are stacked and fixed on a lead frame in the anode side, and the cathode parts are stacked and fixed to one another by an electrically conducting adhesive layer, with at least one electrically conductive adhesive layer being fixed on a lead frame in the cathode side.

4. A solid electrolytic multilayer capacitor comprising a plurality of stacked and fixed single plate capacitor elements each comprising
   an anode substrate comprising a plate-like valve-acting metal having on the surface thereof an oxide dielectric film layer, wherein an edge part of the anode substrate acts as an anode part and an area of said oxide dielectric film layer where a solid electrolyte layer and an electrically conducting layer are sequentially formed acts as a cathode part, wherein the solid electrolyte layers of the single plate capacitor elements stacked are not of the same length.

5. The solid electrolytic multilayer capacitor as claimed in any one of claims 2 to 4, wherein in the single plate capacitor element, the thickness of a distal end portion of the cathode part is larger than the thickness in a basal portion of the cathode part.

6. The solid electrolytic multilayer capacitor as claimed in any one of claims 1 to 4, wherein the electrically conducting adhesive layer is formed over the area from a distal end of the cathode part to 80% of the cathode part length.

7. The solid electrolytic multilayer capacitor as claimed in any one of claims 1 to 4, wherein the multilayer layer capacitor element comprises a plurality of stacked single plate capacitor elements stacked under pressure.

8. The solid electrolytic multilayer capacitor as claimed in any one of claims 1 to 4, wherein stacking and fixing between respective cathode parts of the plurality of single plate capacitor elements and between a cathode part and the lead frame in the cathode side are performed by means of an electrically conducting adhesive layer and the thickness of the electrically conducting adhesive layer of a single plate capacitor element is larger in a distal end portion of the cathode part than in a basal portion of the cathode part.

9. The solid electrolytic multilayer capacitor as claimed in any one of claims 1 to 4, wherein the solid electrolyte layer comprises an electrically conducting polymer.

10. The solid electrolytic multilayer capacitor as claimed in claim 9, wherein the electrically conducting polymer is a polymer containing at least one chemical moiety selected from the group consisting of a chemical structure of a polymerizable 5-membered heterocyclic compound, aniline, benzene, p-phenylene vinylene, thienylene vinylene, isothianaphthene, naphtho[2,3-c]thiophene and their substituted derivatives for forming a divalent group.

11. The solid electrolytic multilayer capacitor as claimed in claim 10, wherein the polymerizable 5-membered heterocyclic compound is 3,4-ethylenedioxy-thiophene or a substituted derivative thereof.

12. The solid electrolytic multilayer capacitor as claimed in any one of claims 1 to 4, wherein the number of stacked single plate capacitor elements stacked are from 2 to 20.

13. The solid electrolytic multilayer capacitor as claimed in claim 1, 2 or 4, wherein the stacking and fixing the single plate capacitor elements on a lead frame in the anode side while aligning the anode parts in the same direction is by spot welding.

14. The solid electrolytic multilayer capacitor as claimed in claim 3, wherein the stacking and fixing the anode parts aligned in the same direction on a lead frame in the anode side is by spot welding or laser welding.

15. A solid electrolytic multilayer capacitor having a CV value per unit volume, of $7.1 \times 10^3$ V·F/m$^3$ or more.

16. The solid electrolytic multilayer capacitor as claimed in any one of claims 1 to 4, wherein the CV value per one unit volume is $7.1 \times 10^3$ V·F/m$^3$ or more.

* * * * *